J. H. BUMP.
Churn.
No. 21,871.
Patented Oct. 26, 1858.
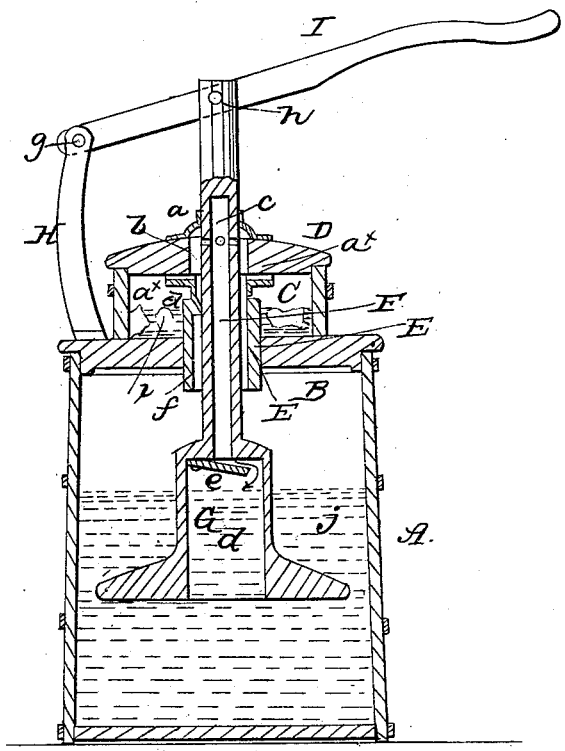

UNITED STATES PATENT OFFICE.

JAMES H. BUMP, OF MORRIS, NEW YORK.

CHURN.

Specification of Letters Patent No. 21,871, dated October 26, 1858.

*To all whom it may concern:*

Be it known that I, JAMES H. BUMP, of Morris, in the county of Otsego and State of New York, have invented a new and Improved Churn; and I do hereby declare that the following is a full, clear, and exact description of the same, reference being had to the annexed drawing, making a part of this specification, said drawing being a central vertical section of my invention.

To enable those skilled in the art to fully understand and construct my invention I will proceed to describe it.

A, represents the case or body of the churn, which may be of the usual conical taper form provided with a lid B, on which a chamber C, is formed, which chamber is also provided with a lid D.

At the center of the chamber C, and in the lid B, of the case A, a vertical tube E, is fitted or placed centrally, said tube forming a direct communication between the interior of the case A, and the chamber C, as shown clearly in the drawing.

F represents the dasher staff, which works through the tube E, and through metal boxes $a$, $a'$, attached one to the upper and the other to the lower side of the lid D. The staff F, works singly in the boxes $a$, $a'$, but a space $b$, is allowed between it and the aperture which the boxes $a$, $a'$, cover. The staff F, is hollow, is perforated at its upper part as shown at $c$, and the dasher G, which is attached to the lower end of the staff is also hollow or has a chamber $d$, formed within it, said chamber communicating with the interior of the staff by means of a valve $e$, opening downward, the lower box $a'$, is fitted over radial grooves $a^z$, made in the bottom of the lid D, to afford a communication between chamber C, and the space $b$.

The tube E, in the lid B, is sufficiently larger in diameter than the shaft F, to allow a space $f$, all around the staff. To the upper side of the lid B, at one side an upright H, is attached, and a lever I, is attached thereto by a fulcrum pin $g$. The upper end of the staff F, is attached to lever I, by a pin $h$, which passes through an oblong slot in the lever to compensate for the curvilinear movement thereof.

Within the chamber C, a requisite quantity of ice $i$, is placed, and a suitable quantity of cream $j$, is placed within the case A. The operator grasps the lever I, and by working it up and down a corresponding movement is of course given the dasher. At every upward movement of the staff F, the air from the chamber C, rushes down within the staff F, into the chamber $d$, the valve $e$, opening downward, see black arrows, and as the dasher descends the valve $e$, closes and the air within will be forced into the cream $j$, and at the same time the air in the case above the cream will be compressed by the rising of the cream $j$, owing to the immersion of the dasher, and said air will pass up the space $f$, into the chamber C, and thence into the staff F, through the passages or grooves $a^x$, to be again forced down into the cream upon the descent of the dasher.

By this invention it will be seen that the cream will be supplied with a requisite quantity of oxygen a continual current of cold air passing through it. The cream by the absorption of oxygen is fully acetified and the condition for the favorable aggregation of the globules of butter of a superior quality obtained, for the coolness imparted to the air by the ice $i$, prevents the temperature of the cream from rising, a contingency, which would occur and inferior butter produced provided the air was of an equal or higher temperature with the cream.

I do not claim, broadly, the invention of a hollow dasher rod for the admission of air to the cream.

I do not claim forcing air into cream, or supplying cream, while subjected to the operation of churning with oxygen for this has been previously done; but, having thus described my invention,

What I claim as new and desire to secure by Letters Patent, is—

The arrangement and combination with the churn of a chamber C, through which the air that mingles with the cream is made to circulate, substantially as and for the purposes herein shown and described.

JAMES H. BUMP.

Witnesses:
JONAH DAVIS,
DANIEL SMITH.